United States Patent [19]

Hilderman

[11] Patent Number: 5,030,100
[45] Date of Patent: Jul. 9, 1991

[54] ENVIRONMENTAL DISPLAY SYSTEM

[76] Inventor: Garry M. Hilderman, 500-115 Bannatyne Ave., E., Winnipeg, Manitoba, Canada, R3B 0R3

[21] Appl. No.: 402,566

[22] Filed: Sep. 5, 1989

[51] Int. Cl.⁵ ............................................. G09B 27/08
[52] U.S. Cl. .................................... 434/132; 434/143; 434/144; 434/146; 362/363
[58] Field of Search ............... 434/131, 132, 142, 143, 434/144, 146, 284, 285, 286, 287, 288; 362/363, 809

[56] References Cited

U.S. PATENT DOCUMENTS

| | | |
|---|---|---|
| 2,455,209 | 11/1948 | Anderson . |
| 4,276,561 | 6/1981 | Friedman .......................... 434/131 X |
| 4,276,705 | 7/1981 | Barth et al. . |
| 4,449,941 | 5/1984 | McGuire et al. . |
| 4,474,557 | 10/1984 | Clossey . |
| 4,530,666 | 7/1985 | Triplett . |
| 4,609,359 | 9/1986 | Erickson et al. . |
| 4,752,228 | 6/1988 | Masunaga .............................. 434/31 |
| 4,776,666 | 10/1988 | Kuehn et al. .................... 434/286 X |
| 4,790,756 | 12/1988 | Caldwell ......................... 434/146 X |

Primary Examiner—Richard J. Apley
Assistant Examiner—Jennifer L. Doyle
Attorney, Agent, or Firm—Adrian D. Battison; Stanley G. Ade; Murray E. Thrift

[57] ABSTRACT

A system for displaying educational material relating to environmental matters comprises a computer, a laser-disc player for extracting video and audio signals and a globe which comprises a representation of the earth with an array of constantly spaced light emitting elements arranged on the surface of the globe so they can illuminate various patterns across the earth. The computer can control the patterns in stationary or moving format to illustrate various effects for example holes in the ozone layer, movement of pollution across the earth, the depletion or tropical rain forest. The array of illuminated lights in one preferred arrangement is formed by a plurality of optical fibers which are buried in an outer surface of the globe and which are connected together at an input end receiving light from a monitor screen on which the patterns are formed. A number of different monitors are provided each for generating illumination of a portion of the globe.

15 Claims, 3 Drawing Sheets

ENVIRONMENTAL DISPLAY SYSTEM

BACKGROUND OF THE INVENTION

This invention relates to a display system for use as an educational aid particularly for providing students and the public with an improved understanding of environmental matters on a global or continental scale.

Public concern for the state of the environment has grown over the last few years with increasing evidence of such global disruptions as the greenhouse effect, acid rain, and ozone depletion. More than ever, there is a need for an accurate, effective means to make these issues comprehensible to the public so that they can understand their complexity, gain a sense of the role the public can play in resolving the problems, and make more informed decisions regarding the environment in future.

Environmental issues have a number of unique features which should be considered in an attempt to communicate in this area:

(a) They are complex problems, based on an intricate web of global interrelationships which ignore political boundaries. Thus, one of the primary abilities of the display must be to show how everything in the world is connected.

(b) They are human problems, caused by us and ultimately affecting us. The display should help us understand environmental problems on a personal level, and our responsibility in solving them.

(c) Most are global problems, widespread and generally growing in extent. Another task then must be to communicate magnitudes, and bridge the gap between global and human scales.

(d) They are dynamic problems, in a state of constant flux; with new understanding emerging every day. The display must be capable of illustrating change, and helping people relate to the various time frames on which environmental problems operate.

Therefore this problem might be viewed as requiring four different displays, each tackling a different aspect of the issue in question: complexity, human factors, size, and time scales.

(a) An Interaction Web: which would produce diagrams of interrelationships between key variables in a particular issue or set of issues. Users could ask "What if?" questions of this network, and observe the effects of the changes on other variables. For example, someone might ask about the results of food shortages in the Third World. The interaction web would show how a decrease in food supply may lead to unrest and political instability, which in turn affects policies for soil conservation, which further reduces food supply.

(b) An Action Guide: which lists ways that the attitudes and behaviors of an individual affect the environmental situation generally and in reference to particular issues. A print out of these suggestions should be made available.

(c) A Scale Bridge: which relates the extent of global disruptions to an immediately comprehensible size, such as the property on which the Exhibit is located, or perhaps a square unit marked on the floor around the display.

(d) A Time Monitor: which shows how an issue is proceeding, and provides comparisons with the past to show rate of change and projected futures. Again, a way to compare units must be devised, something like an environmental clock, marking how many people were born that day on the planet, how many species were wiped out, how much soil lost, etc. Another feature of this display should be a news line, through which users could access a list of recent news items on a particular issue. Items which contain good news (successful conservation measures, etc.) can be highlighted.

It would be a relatively simple matter to design any of the previously described displays. However, the challenge is to develop a system that goes as far as possible to integrate the four display functions into a single unit, in order to promote a fuller, more realistic understanding of the problem situation.

For example, to integrate the "scale bridge" function with the "time monitor" function, a square marked on the floor serving as the base unit for size comparisons could also have its edges inset with a series of sixty lights, which are activated one after another every second so that each minute a circuit is completed around the square. It is both a time piece and a unit of area. A read out in the square would indicate how many units of forest are lost in Manitoba in a minute, or they could blink in unison each time a unit of forest is lost.

The integrated system should have the following characteristics:

(a) It should be an interactive format, offering a range of choices to the user in accessing information. Learning is most effective when people ar actively involved. As they navigate their way through a particular problem, they select a pattern of information uniquely tailored to their interests and level of comprehension, thereby promoting a more personal understanding. This is especially important in environmental issues, which can appear overwhelming and faceless.

(b) It should be capable of expansion, and adaptable to new issues as they arise.

(c) It should be able to plug into the extensive network of environmental information, and flexible enough to incorporate new information as it becomes available. This updating allows an accurate depiction of changing environmental conditions, and is an incentive for users to return to the system throughout the year.

(d) It must provide some means of relating events on a global scale to everyday experience, in both the spatial and temporal dimensions.

Some other general considerations affecting the design of the system:

(a) It must be transferable, if not in its entirety, then through the software that drives it.

(b) It should be useful for guided situations and self-initiated learning, for groups and for individuals.

(c) It should break from or extend traditional computer or video productions. As home video capabilities become more advanced, standard interpretive displays are bound to become obsolete. A unique and dramatic format, incorporating a specialized configuration of input and output devices is unlikely to be replicated for home use, and will ensure a greater audience and a longer life span of interest. Another reason for an alternative format is that the undifferentiated mixture of fact and fiction on television may lower the credibility of the video medium, especially for children. Television is seen as a source of entertainment first; only rarely is it perceived as an accurate reflection of reality.

In short, the system should strike a balance between being too simple and common to be of interest, and being so complex that software cannot be transferred and is too expensive to update.

Regardless of its final form, the system should contain a means of turning raw information into a presentation (a scripting device), a means of displaying the presentation (an output device), and a means of activating and manipulating the presentation (a control device). Factors relating to these items are as follows:

(a) Scripting Device:
  fast and easy to use;
  flexible;
  easy to learn;
  creates standard presentation "templates" for a range of issues;
  uses inexpensive hardware;
  patches into the network of environmental information through modem or other means;

(b) Output Device:
  allows people to relate to global sizes and time spans;
  strikes a balance with other displays, neither drowning them out or being overshadowed itself;
  communicates to groups or individuals;
  avoids simple video monitors for the reasons discussed above, or uses them to supplement a more vivid and tangible form of display;
  The form of an alternative output device should be responsive to the way our senses operate. For instance, several of the following operations propose a spherical output device, because it is a good form for communicating ideas about the extent and location of environmental problems, but it is hard to see in its entirety. These options therefore either ask people to move around the globe, or involve a mobile globe.

(c) Control Device:
  allows the user maximum flexibility to tailor the message to his interests and abilities;
  easily customized to provide control options specific to each presentation;
  fun and easy to use;
  accessible to all ages and handicapped people;
  control device and the output device should be in the same cone of vision, to keep the users involved in the presentation, rather than splitting their attention between controlling and observing.

At present no display system for educational material and environmental issues is known which provides a satisfactory solution for filling the above parameters. Various illustrations of parts or the whole of the world are shown in the following patents many of which include devices for illuminating or indicating particular parts of the map for example, cities or states for educational purposes. However none of these are suitable for displaying environmental issues.

U.S. Pat. No. 2,455,209 (Anderson) provides a weather map having a plurality of stations representing towns or cities outlined thereon and provided with means for visually indicating at each station the present or forecasted weather conditions of the station.

U.S. Pat. No. 4,474,557 (Clossey) discloses a world map game which has a number of separate points on the map which can be illuminated to identify particular features such as cities or countries.

U.S. Pat. No. 4,609,359 (Erickson) discloses an educational game in which a map has illuminated parts thereon to identify for example the various states.

U.S. Pat. No. 4,530,666 (Triplett) discloses a walk-in globe with the features of the world illustrated on the inner surface so that the whole of the globe can be observed from the interior of the sphere.

U.S. Pat. No. 4,276,705 (Barth) discloses a map having a thin opaque cover which can be pierced by pins to allow light to shine through at various locations chosen by the person inserting the pins.

U.S. Pat. No. 4,449,941 (McGuire) discloses an educational device for learning the locations and names of the various states of the United States using a device which has points which can be illuminated to indicate particular ones of the states.

None of the above devices is however in any way suitable for displaying educational materials in relation to environmental issues apart from the very simplistic point of natural geographical locations of various points of interest.

SUMMARY OF THE INVENTION

It is one object of the invention, therefore, to provide a device which is suitable for displaying educational material relating to environmental issues in a manner which can illustrate on a global or large scale various effects and their changes in time.

According to the invention, therefore, there is provided an apparatus for use in displaying educational material comprising means defining a representation of at least a portion of the earth's surface, a plurality of light emitting means mounted on said representation means such that light emitted by said emitting means can be viewed by an observer while observing the representation means, the light emitting means being positioned on the representation means as a substantially constantly spaced array, and means for controlling illumination of said light emitting means such that different patterns of illumination on said representation means can be formed.

With the foregoing in view, and other advantages as will become apparent to those skilled in the art to which this invention relates as this specification proceeds, the invention is herein described by reference to the accompanying drawings forming a part hereof, which includes a description of the best mode known to the application and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
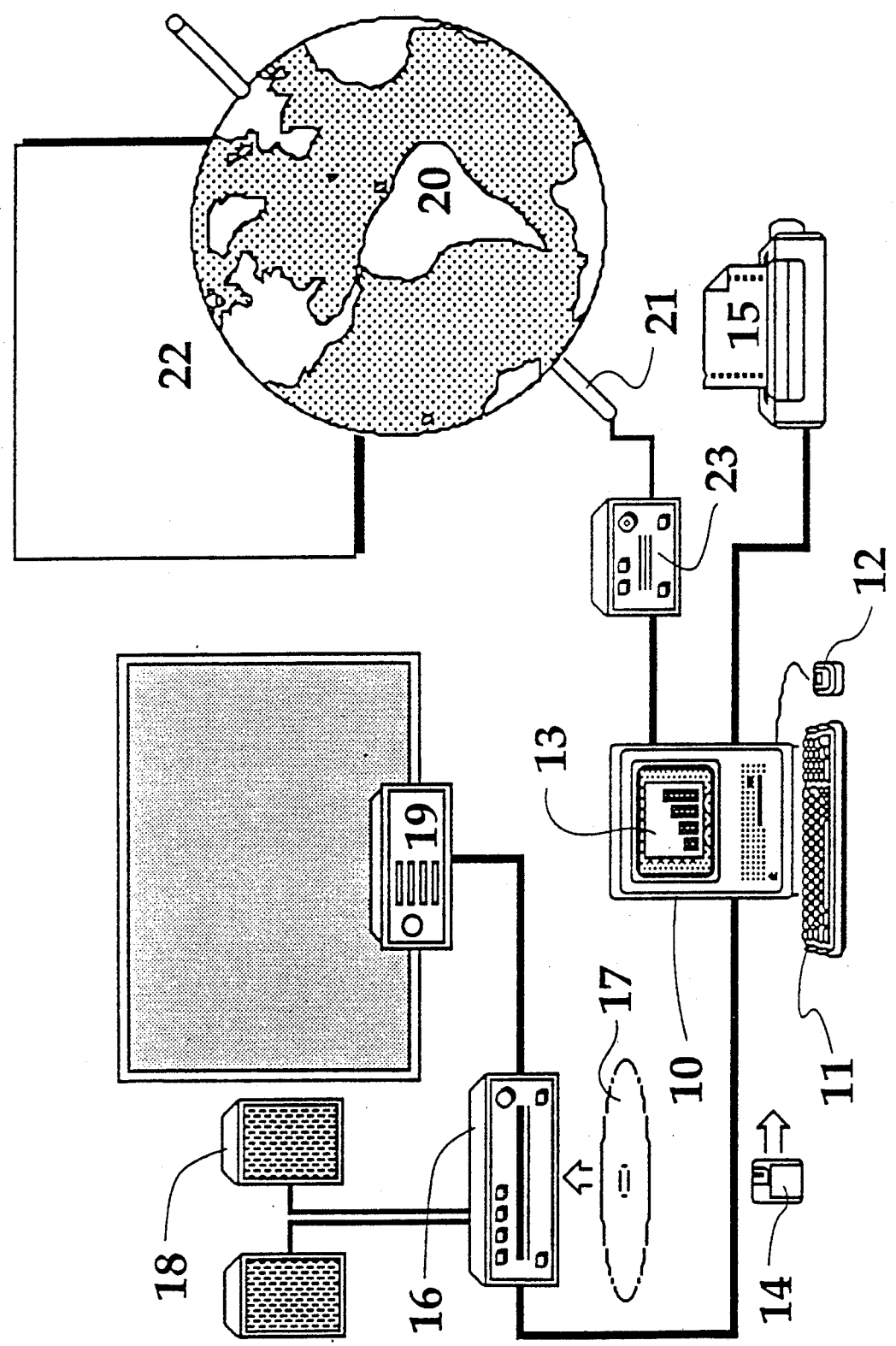
FIG. 1 is a schematic illustration of a system for displaying educational material according to the present invention.
Figure 2:
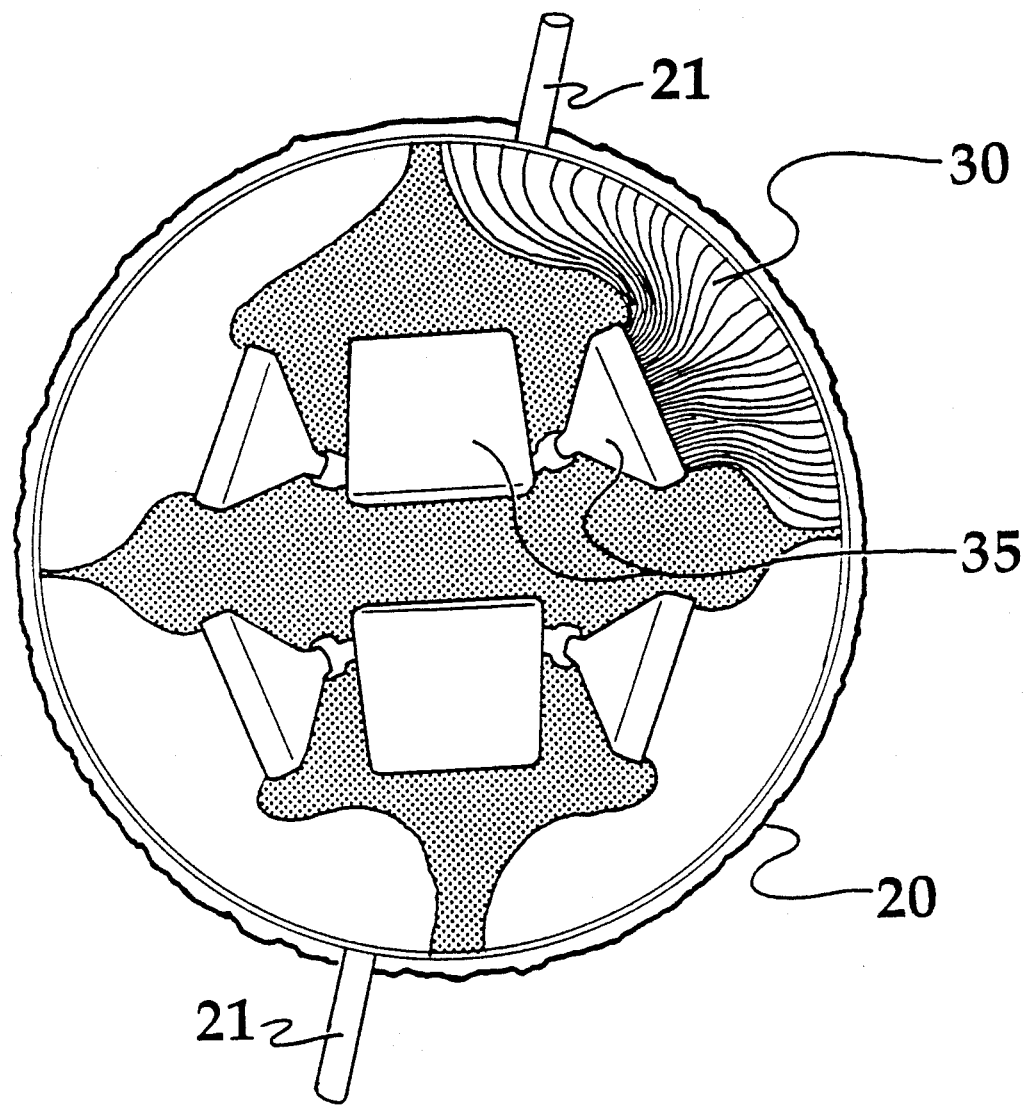
FIG. 2 is a schematic illustration of the globe portion of the system of FIG. 1.
Figure 3:
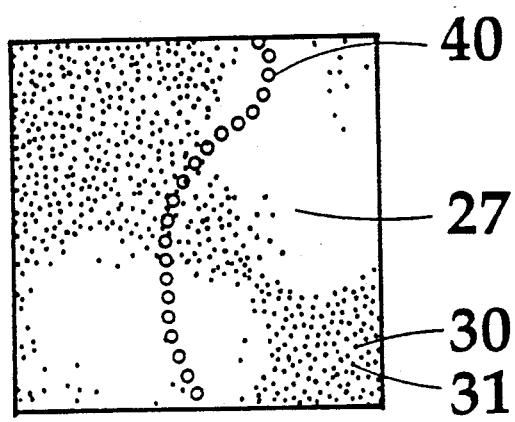
FIG. 3 is a view of a portion of a globe showing the array of light emitting optical fibres on the surface of the globe.
Figure 4:
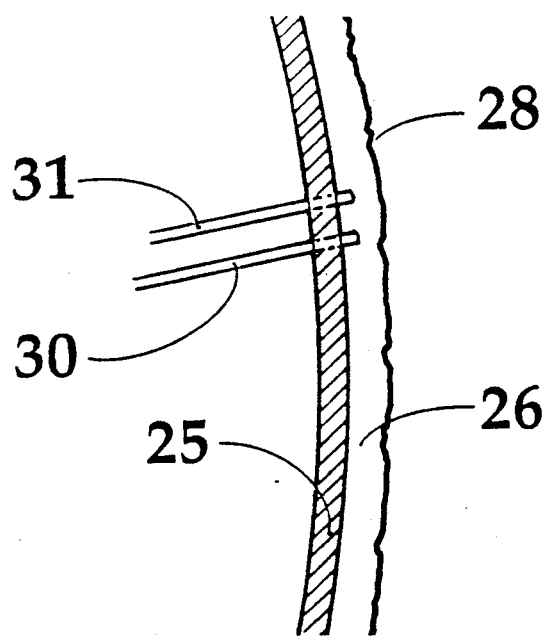
FIG. 4 is an isometric view of a small portion of the globe showing the termination of the optical fibres within the outer layer.

The system shown in FIG. 1 comprises a main controlling computer 10 having a keyboard 11, a mouse 12 and a monitor screen 13. The computer is associated with a floppy disk storage system 14. A printer for the computer is indicated at 15. A laserdisc player is indicated at 16 for receiving a laserdisc 17 for generating visual and audio displays with the video portion being in both moving and stationary mode. A pair of speakers is indicated at 18 associated with a projector 19 for display of conventional educational material. A globe is indicated at 20 which is mounted for rotation about an axis 21 with the globe including an array of illuminating points of light as shown in FIGS. 2, 3 and 4. If required the globe can be replaced by a more simple map panel 22 which comprises a portion of the globe arranged in a flat format as that of a conventional map with the structure of the map being the same as the globe; that is, it has a surface and an array of light emitting fibres for use in the manner described in relation to the globe hereinafter An interface 23 is located between the light display and the computer and includes a program which converts patterns on the computer screen to patterns of the lights on the globe.

Turning now to FIG. 2, the globe 20 is shown in more detail and in FIGS. 3 and 4 further enlarged details of the globe ar shown. The globe thus comprises a spherical body defined by a structural support layer 25 which is mounted for rotation about an axis 21. On the outside of the structural layer 25 is provided a plastics layer 26. The plastics layer is formed of a laminate which has as part of its structure coloured portions defining the appearance of various elements of the earth's surface for example indicated at 27. In addition the surface has a relief pattern, one portion of which is indicated at 28, which provides an enhanced appearance of the earth's surface showing mountains, lakes, etc.

Embedded within the layer 26 is a plurality of optical fibres 30, 31. The ends of the fibres terminate within the layer 26 so that there is a space between the outer most surface of the layer 26 and the end of the optical fibre. Between the outermost surface and the end of the optical fibre is provided a layer which is translucent so as to act as a diffusion for light exiting from the optical fibre.

As best shown in FIG. 3, the optical fibres 30, 31 etc. are arranged in an array which is effectively equidistantly spaced across the whole surface of the globe.

In one example using a globe of four feet in diameter, the spacing between the separate fibres of the array would be of the order of 0.25 inches. Preferably the spacing lies in the range 1/16 to ¼ inches. The array covers the whole of the globe and is equidistantly spaced both in the longitudinal direction and the latitudinal direction.

As shown in FIG. 2, the optical fibres 30 extend from the outer end buried within the layer 26 to an input end. At the input end the optical fibres are clamped together to form an array in which each fibre is immediately adjacent all the further fibres with the array being arranged so that it is identical to the array on the outer surface of the globe. The input end of the array is then mounted immediately adjacent to the outer surface of a monitor screen indicated at 35. The monitor screen thus generates an input illumination which is picked up by those optical fibres which are located on the screen at a position where the illumination is apparent and is transmitted to the outer end of the optical fibre to provide an illumination of a portion of the outer surface of the globe.

As shown in FIG. 2 there are a plurality of the monitor screens and in a practical example there may be between eight and twelve such screens each serving a portion of the outer surface of the globe 20.

The monitor screens are driven by the computer 10 taking the necessary patterns for each monitor screen from the master computer 10.

The pattern of illumination on the earth's surface can therefore be varied to generate any required pattern from illumination of one or a few of the optical fibres up to the illumination of all of the optical fibres. These patterns can be varied gradually over time in dependence upon moving patterns generated by the master computer 10.

The patterns can be representative of various different aspects of the environment for example holes in the ozone layer, the movement of weather, the depletion of tropical rain forest, the movement of acid rain, the fall-out from a nuclear accident. All of the above relate to areas of illumination which gradually change over time.

In FIG. 3, a further series of light emitting elements are shown at 40. These are separately and permanently wired for illumination and can be formed by a plurality of LEDs embedded in the surface, or by a series of optical fibers which are illuminated by LEDs. This series of light elements can be used to accentuate the edge of a country or other significant feature of the earth.

The illumination can be provided in monochrome or with various different colours as required.

The preferred display as explained above can satisfy at least some of the Display Function Goals previously described. The technology:

(a) allows interactivity;
(b) expandable;
(c) presentations can be easily created, modified, and updated;
(d) relates in space and time to local and global issues;
(e) is unique in presentation format;
(f) useable by individuals or groups in self-initiated learning or guided situations;
(g) is state-of-the art and industry standardized (except for the globe/map displays)
(h) is modular so that the display can be developed in phases and upgrades are easily accommodated;
(i) can be made to be relatively mobile in that each component can be moved independently and reconnected to complete the system.

THE COMPUTER

The computer is the central component of the system. It serves as both the "scripting" and "control" device. The computer is the means of organizing and accessing the information databases (stored on videodisc) and it supplies selected graphics, text, and sound. The computer controls the videodisc player, activates the globe and map displays (the "output" devices), and stores information which can be printed as hard copy. The Macintosh computer is also the medium for authoring the way in which messages are delivered to the user. It is the tool for writing and operating the HyperCard presentations. Therefore, this same computer can be used by the staff to create new presentations and update existing ones.

Apple Computer, Inc. manufactures the Macintosh microcomputer which is ideally suited to the requirements of the system. The best models for the purpose of the display would be the Macintosh SE, the Macintosh SE/30, or the Macintosh IIx. Ideally, the computer would have a touch-sensitive screen to issue commands. MicroTouch System in Massachusetts produces a touch-sensitive screen call "Mac-In-Touch" which fits onto the screen of the SE or Mac II series. Another option is a "turbo mouse" which performs similar to a conventional "mouse" except that the "turbo mouse" is a rollerball fixed to the side of the keyboard.

If a large projection screen is to become part of the display, then the computer does not require a colour monitor. The contrast between black and white and colour will help the user distinguish between the computer screen as controller, and the large screen as display. So a Macintosh SE with a hard drive will suffice, but an SE/30 (a more powerful and more expensive machine) will handle more complex scripts and operate more rapidly.

Keyboard should remain for the users to type message.

THE LASERDISC

The laserdisc is the vehicle for displaying high-quality audio/visual presentation material. The laserdisc stores vast quantities of colour images, video clips, and hi-fidelity sounds which are quickly accessed by the computer. Images are projected onto a large projection screen accompanied by stereo hi-fidelity digital sound.

Laserdisc technology has been available for approximately 15 years but has not achieved widespread acceptance until the last several years due to the increases in commercially available laserdiscs. Laserdisc technology is an excellent tool for an interactive educational display.

Some advantages of a Laserdisc system are listed below:
  (a) Random access to single frames or full motion video (video clips can be played forward, reverse, in fast or low motion, or stopped at high resolution single images)
    access is nearly instant but can be delayed to a maximum search time of 3.5 seconds.
  (b) Hi-fidelity stereo sound and video.
  (c) Excellent audio/visual database
    each laserdisc can store 108,000 frames (54,000 each side) which can hold still images or full motion video at 30 frames per second (conventional film is 18 f/sec) so slow motion resolution is very good. At 30 f/sec the laserdisc holds ~30 minutes each side.
  (d) Can be used with an authoring system ("Hypercard" or "Best Course of Action") to produce multi-media, interactive lessons.
  (e) Durability
    colours don't fade over time as in video tape;
    sound stays high quality;
    no stretch as in tapes.
  (f) Very easy to use
    very low training time and no special skills required.
  (g) Material can be recorded from disk to video tape (Beta or VHS).
  (h) Can operate with or without computer of any brand, any kind however, the laserdisc player must be purchased with a serial port so that it can be controlled by the computer—this is referred to as "Level 3 capability". The laserdisc player must have the proper cable to connect to the computer.
  (i) Presently approximately 8,000 disks are commercially available (catalogue called "Laserdisc Compendium")—See Addenda for samples
    These disks vary in cost from $40.00 to several hundred dollars and contain various databases and movie clips. For example, "THE SUN" is a science laserdisc which contains 15,000 slide images and 150 movie clips and is commercially available for $400.00. A Macintosh HyperCard database has been written for "THE SUN" and costs $45.00. Locating an existing laserdisc(s) more suited to the atmosphere and the Greenhouse would reduce the cost of producing a database for the Changing Atmosphere to a fraction of the cost required to research/film/produce a database from scratch. The ability of the laserdisc player to record onto videotape makes it possible to assemble existing images and movies onto videotape to be "written" onto a new laserdisc.
  (j) Presently there are two types of laserdisc machines on the market: "writeable" and "unwriteable". "Writeable" mean that the machine is capable of recording information onto a blank laserdisc in the same way a VHS or BETA machine can record onto a blank videotape. However, unlike videotape, the laserdisc can be recorded onto only once. Presently there are machines available that are writeable for $12,000.00 with a player machine for under $2,500.00. Unfortunately, discs produced on this machine cannot be played on conventional laserdisc machines Amadeus Corporation claims a recent breakthrough in technology that will bring to market an unwriteable player machine for under $1,000.00.

There are several existing systems using the relatively new laserdisc technology. This provides a feasible starting point, and allows variations on the system to be evaluated on a more or less equal basis.

The model consists of a laserdisc player connected to a Macintosh computer as control device and a large screen television monitor as output device. The disk contains a series of pre-recorded still images, which are catalogued on the computer. Laserdisc technology is becoming a standard medium for interpretive display purposes. It offers vast storage capacity (up to 54,000 images per side), high quality video imagery, and extremely fast retrieval of information (maximum two-three second delay). The same disks can store a mixture of still images, animated sequences, and audio signals. They are pressed by 3M in the U.S. for about $2,000.00 dollars, with inexpensive additional copies (about $18). Presently, recordable ("writeable") laserdisc machines are available on the market but are expensive ($12,000.00+) and the discs must be played on a special player machine.

The scripting of the presentation is done by the people who assemble the images for the laserdisc onto one inch video tape, and by the Macintosh computer, using the same software that drives it as a control device. This software, programmed in Hypercard TM by the Voyager Ltd. of Ottawa allows the interpretive staff to define "buttons" such as "stop", "play", or "more info" on a touch-sensitive screen. Users can work their way through an issue, raise questions, call up more information on the Macintosh screen, and manipulate the high quality colour images from the laserdisc. The HyperCard program can also cater to groups, driving the disk in a preprogrammed sequence of still images, animation, and sounds, like a movie.

The major advantage of this approach is that it offers a high degree of flexibility for the control device. Using a touch sensitive screen allows the interpreters to design an interesting custom keyboard for each issue, as simple or complex as the issue dictates. Other advantages are that Hypercard TM programming is simple, fast, and offers easy integration of graphics and text. No special expertise or large investment of time is required to produce presentations or update them.

THE GLOBE

The acrylic coating serves to protect and hold in place the fibre optic filaments. One layer would be matte finished so that light coming from the filaments is slightly diffused onto the globe surface. Information pertaining to the earth can be etched into the layers of acrylic as it is applied. Through a series of video monitors, graphic information stored in the computer is transmitted to the surface of the globe via the fibre optic filaments to illuminate appropriate globe areas.

Each monitor graphically represents a designated part of the Globe and all monitors are run by the central computer with another smaller "slave" computer (the Interface system) to carry the processing demands of the system. The slave computer partitions the globe into areas to be graphically represented by each monitor. A program is necessary to translate graphic requirements from the computer into images for each monitor.

The monitors are located inside the display globe. One end of each fibre is attached to the monitor (the light source) and the other end is inserted into the surface of the globe. Thus, images (light) from each monitor are carried to the surface of the display globe through the fibre optic filaments.

Images requiring visual crispness (such as outlines of land masses) could be "hardwired" (permanently fixed) and have a separate light source of variable intensity. The light intensity of the hardwired areas could be adjusted for specific displays (for example, the outlines of continents could be slightly dimmed when showing wind/cloud patterns or turned bright to show areas of the globe where air pollution is being generated).

The advantages of such a system are:
1. Because the system relies on the graphic translation of colour video monitors to the globe surface, there is a high potential for visual variety.
2. The system is only limited by what can be graphically produced on the monitors and by the number of fibres that can be fixed to the monitor (up to 45,000 fibre optics per monitor).
3. It is easier to achieve higher resolution on the surface of the globe using the fibre optic system. Adding more monitors (and more fibre optics) will increase the resolution of the globe.
4. It is possible to rotate the globe with this system.
5. Adding more fibre optic filaments to increase graphic resolution requires no additional electrical power. Light intensity for each filament depends only on the light intensity of the monitor.
6. Images on the display globe can be changed rapidly because processing time would be greatly reduced by the use of video monitors.
7. Since the fibre optic filaments rely on a monitor as light source, there would be the necessity to perform the difficult operation of replacing burned-out individual lights.

Other less preferred possibilities for illumination of the Globe are as follows:

a) The Rear Projection Globe/Map Displays
Description: A partially silvered mirror merges the images of a rotating fibre optic globe with an array of video screens.
Advantages:
  a 3-D format, both interesting and unique;
  cheap technology, could be manufactured locally;
  vandal resistant;
  same as fibre optic globe, but more flexible in range of information that can be presented;
  the globe can be rotated without hydraulics, because rollers and axles can be hidden;
Disadvantages:
  the ghost-like image behind glass seems remote and unreal, too much like television;
  limited viewing options—the illusion can be seen from one direction only;

b) The Spherical Liquid Crystal Display Television Monitor
Description: A stationary spherical black-and-white television screen, mounted on a pole. The screen would be built up of a series of curved individual screens, which could act in unison to simulate a rotating globe for example, or each screen could project a different image, to create a collage.
Advantages:
  a very dramatic and unique format;
  combines the flexibility of video monitor with the tangibility of a globe;
  doesn't require mechanical parts—rotation can be achieved by animating the video image;
  lots of viewing options for groups or individuals;
  frees up floor space;
  might become a marketable product—an incentive for technologist to develop it;
Disadvantages:
  involves very expensive, custom manufacturing;
  requires a high level of technical expertise to construct it and vary presentations;
  software applies only to this output device, limiting its transfer;
  legibility may be affected by the seams between screen units;
  lighting becomes an issue: it would require a dark area to be most effective;

c) The Laser Projecting Globe
Description: The laser projection method involves processing graphic information from the computer through an x-y scanner. The x-y scanner deflects a beam of light coming from the laser in much the same way a beam of electrons is deflected in an ordinary television picture tube except that the x-y scanner uses a system of mirrors to deflect the light.
Advantages:
  very flexible system;
  could create very interesting visual effects such as swirling clouds and very rapid changes of information;
  clean and attractive display system;
  relatively easy system to produce in larger quantities (not labour intensive);
  lasers are relatively cheap (approximately $200.00 ea.) and are available "off the shelf".

Disadvantages:
  colour is monochrome;
  the existing state of this complex technology requires the x-y scanner to be continuously monitored and adjusted during its operating life. This would require a specialized technical person to be available full-time.

d) LED Display Globe

Description: The Display Globe is a fixed (preferably suspended), four-foot diameter fibreglass sphere representing the Earth. The surface of the sphere is composed of densely spaced light emitting diodes (LEDs) embedded into an acrylic covering layer (or similar strong, durable, transparent/translucent material). The acrylic coating serves to protect and hold in place the LEDs. One layer would be matte finished so that light coming from the filaments is slightly diffused onto the globe surface. Information pertaining to the earth can be etched into the layers of acrylic as it is applied. Graphic information stored in the computer is transmitted to the surface of the globe via the LEDs to illuminate appropriate globe areas.

Advantages:
  The LED system was pursued because of the relative simplicity of the technology compared with the other systems and the long life span (100 years) of the LEDs. As well, LEDs are low cost, readily available, and reliable.
  It is relatively simple to design the required system from the interface unit through to the LED arrays ("Drive" hardware). The drive hardware (not including the LEDs or globe) would cost approx. $2,000.00.
  It would be necessary for a computer programmer to write a Patch Program that would translate image information from the computer to the interface unit of the globe (this is not a difficult task but complexity increases with graphic requirements).

Disadvantages:
  The LED option is based on a system using 65,000 LEDs. With this number of LEDs the technology is being pushed to the limit in both terms of physical construction and scanning procedures. A four foot diameter globe at 0.25" LED spacing (which, in our opinion, is resolution too coarse for close viewing) requires a number of LEDs exceeding 115,000. For the highest resolution using the smallest LEDs we were able to locate, the number would exceed 425,000 LEDs. The wiring required for this figure would not be feasible. The problem of the LED system stems from the compromise of graphic resolution due to technological limitations.
  The major obstacle in producing this system is the labour (due to limits of technology) required in wiring and soldering the large number of LEDs required.
  The display globe would be monochrome using LEDs and because of costs would likely be red.
  Fabrication of curved fibreglass panels with the required number of pre-drilled holes to hold the LEDs would be very difficult and expensive.
  The globe would be unable to rotate.
  Only a few thousand LEDs can be on at a given moment and the display would be limited to an LED change of 300 per second.
  The number of LEDs is limited to 65,000 because of:
  i) The power requirement to fire the individual LED. The 65,000 figure assumes that the individual LED will be scanned at 30 hertz which will reduce power consumption considerably. For numbers over 65,000 (eg. 115,000 for a four foot diameter globe) the LEDs will operate at lower scanning rates but the result will be a dimmer illumination until a critical point is reached where there is insufficient power available to fire the LED.
  ii) The driving mechanism of the computer to the LEDs becomes very cumbersome when the arrays become numerous. The computer processing time between changes in lighting patterns increases creating long delays to the observer.

e) The Fibre Optic Globe (LED Light Source)

Description: A globe, 2.5 to 3 meters in diameter, with a matrix of fibre optic filaments embedded in its surface. These filaments could be programmed to change colours, flash traveling patterns, outline districts, indicate locations, etc. This system assumes that each filament would have a separate light source (a Light Emitting Diode).

Advantages:
  unique 3-D format;
  inexpensive technology, could be manufactured locally;
  model offers more realistic, tangible example than video;
  might be able to illustrate other ideas, such as the passage of time, eclipses, etc.
  clearly indicates the global nature and extent of environmental problems, as an icon and an information source.

Disadvantages:
  limits in resolution, colour options, and brilliance using individual light sources: the amount of information that it could show depends on how fine the grid of light sources is, and the finer the grid, the higher the cost to manufacture and program the globe;
  globe format needs mirrors or a hydraulic lift to make the poles visible;
  not as varied and legible as a video image;
  does not act as a scale bridge: it provides no way to relate continent-sized events to everyday experience;
  limited to illustrating environmental issues that are global in scale.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrated only and not in a limiting sense.

I claim:

1. An apparatus for use in displaying educational material comprising means defining a representation of at least a portion of the earth's surface said representation means having thereon fixed indicia representing fixed characteristics of the earth's surface, a plurality of light emitting means separate from said indicia mounted on said representation means such that light emitted by said emitting means can be viewed by an observer while observing the indicia of the representation means, the light emitting means being positioned on the representation means as a substantially constantly spaced array, means for generating a plurality of patterns each constituting a simulated representation of information relating to said portion of the earth's surface, and means for controlling illumination of said light emitting means such that the patterns are displayed sequentially to form a dynamic representation of the change of said information relative to the fixed indicia.

2. The invention according to claim 1 wherein the representation means comprises a spherical globe with the whole surface of the globe being substantially wholly covered by said array of light emitting means.

3. The invention according to claim 2 wherein the glove is rotatable about an axis.

4. The invention according to claim 2 wherein the globe has an outer surface having thereon said representation means comprising a relief pattern representative of features of the surface of the earth.

5. The invention according to claim 4 wherein the light emitting means are embedded in the outer surface.

6. The invention according to claim 1 wherein the representation means includes an outer layer which is transluscent and which defines an outermost surface having said indicia, the light emitting means being embedded in the outer layer at a position spaced from the outer most surface such that light emitted by the light emitting means is diffused by the layer.

7. The invention according to claim 1 wherein said means for controlling comprises a computer having an input system, a monitor screen and means for storing said patterns.

8. The invention according to claim 7 wherein the storing means comprises a computer and means for reading patterns stored in the computer.

9. The invention according to claim 7 wherein the computer system includes loud speakers and an image projection system separate from said representation means.

10. The invention according to claim 1 wherein each of said light emitting means comprises an optical fibre for communicating light from a light source to an end of the fibre at the representation means.

11. The invention according to claim 10 wherein in the light emitting means are embedded in the outer surface.

12. The invention according to claim 10 wherein in a plurality of the optical fibres are associated together at inlet ends thereof in an array of the inlet ends with the inlet ends being mounted immediately adjacent a monitor screen on which said patterns are formed for communication of said patterns from the screen through the optical fibres to the representation means.

13. The invention according to claim 11 wherein there is provided a plurality of monitor screens each being associated with a portion of the representation means.

14. The invention according to claim 1 including a plurality of further light emitting means mounted on the representation means and illuminated from a separate source so as to provide outlines of various earth features.

15. A method for displaying educational material comprising defining a representation of at least a portion of the earth's surface having thereon fixed indicia representing fixed characteristics of the earth's surface, providing a plurality of light emitting means separate from said indicia mounted on said representation means such that light emitted by said emitting means can be viewed by an observer while observing the indicia of the representation means, the light emitting means being positioned on the representation means as a substantially constantly spaced array, generating a plurality of patterns each constituting a simulated representation of information relating to said portion of the earth's surface, and controlling illumination of said light emitting means such that the patterns are displayed sequentially to form a dynamic representation of the change of said information relative to the fixed indicia.

* * * * *